(12) United States Patent
Wu et al.

(10) Patent No.: US 9,060,106 B1
(45) Date of Patent: Jun. 16, 2015

(54) BORDER DETECTION IN VIDEOS

(75) Inventors: Chen Wu, Mountain View, CA (US);
Sang-Uok Kum, Sunnyvale, CA (US);
Thierry Foucu, San Jose, CA (US)

(73) Assignee: Google Inc., Mountain View, CA (US)

( * ) Notice: Subject to any disclaimer, the term of this patent is extended or adjusted under 35 U.S.C. 154(b) by 135 days.

(21) Appl. No.: 13/527,546

(22) Filed: Jun. 19, 2012

(51) Int. Cl.
*H04N 3/22* (2006.01)
*H04N 19/40* (2014.01)

(52) U.S. Cl.
CPC . *H04N 3/22* (2013.01); *H04N 19/40* (2013.01)

(58) Field of Classification Search
USPC .......................... 348/441, 445, 458, 561, 562
See application file for complete search history.

(56) References Cited

U.S. PATENT DOCUMENTS 5,249,049 A * 9/1993 Kranawetter et al. ......... 348/473
5,262,864 A * 11/1993 Saeger et al. ................. 348/561

* cited by examiner

*Primary Examiner* — Jefferey Harold
*Assistant Examiner* — Michael Teitelbaum
(74) *Attorney, Agent, or Firm* — Amin, Turocy & Watson, LLP

(57) ABSTRACT

Systems and methods for border detection on videos are disclosed herein. The system can include a refinement component that updates a variable as a function of a change in line number, wherein the change in line number is ascertained in response to a change in luminance values and/or chroma values associated with a border and a video area included in a frame associated with an original video. Further, the system also includes a trimming component that, as a function of the variable, crops the border from the frame that includes the video area of the resized original video.

7 Claims, 18 Drawing Sheets

BORDER DETECTION IN VIDEOS

TECHNICAL FIELD

The subject disclosure relates to videos, and more particularly to border detection in videos.

BACKGROUND

Many videos that are uploaded to video-sharing or media-sharing websites have constant black (or colored) borders (or bars). Specifically, many uploaded videos have top and/or bottom black (or colored) bars that extend along the top and/or bottom periphery of each frame of a video. The bars can also extend down the left boundary and/or the right boundary of each frame of a video. There are instances where it would be beneficial if these borders are removed or cropped, for example, because the inclusion of the borders, during playback of the video, can reduce the footprint within which true video content can be displayed. Further, the inclusion of the borders can skew or bias a video quality metric because a monolithic color can be perceived by the video quality metric as uniform media content that is easy to transcode.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of the particular aspects of the disclosure, or any scope of the claims. Its sole purpose is to present some concepts of the disclosure in a simplified form as a prelude to the more detailed description that is presented later.

In accordance with one or more implementations of the disclosure, various non-limiting aspects are described in connection with border detection on videos. For example, in accordance with a non-limiting implementation, presented is a method in which a microprocessor is used to execute computer executable instructions stored in a non-transitory computer readable medium to perform the acts of detecting a line number (e.g., a line number of a row of pixels) at which a change from a border area to a video area included in a frame associated with a video occurs. The line number is updated in response to a determination that a different line number is associated with the change between the border area and the video area included in a subsequent frame of the video.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

DETAILED DESCRIPTION

Figure 1:
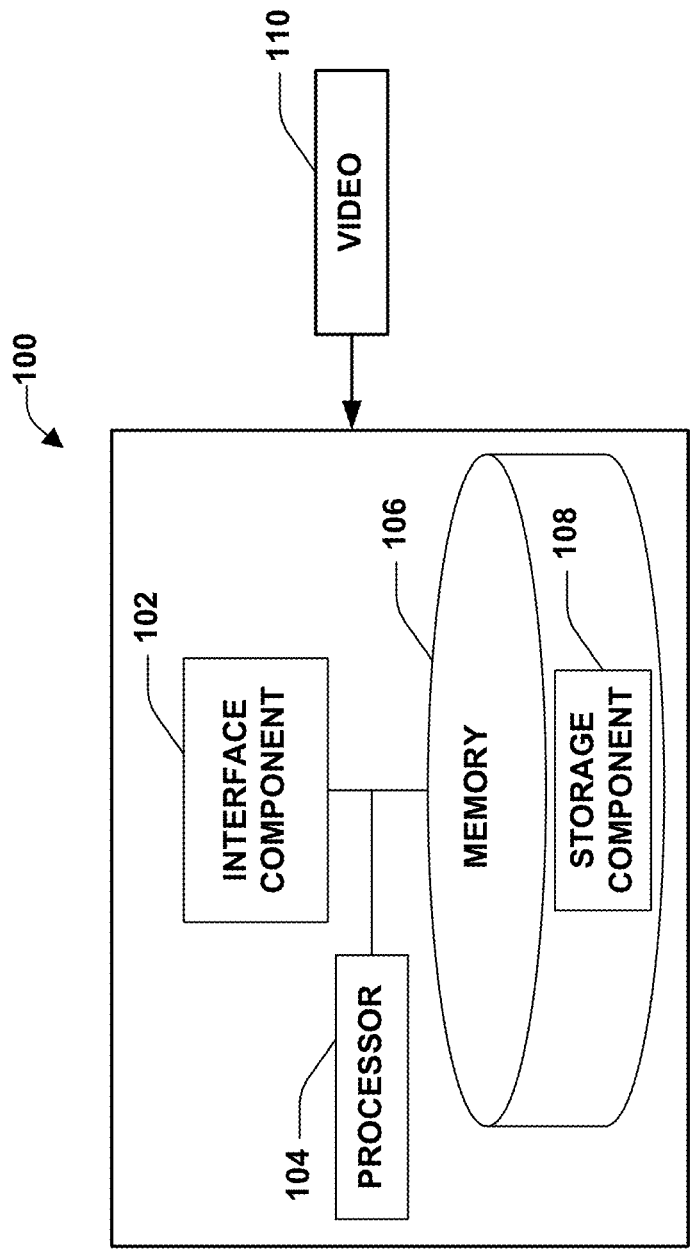
FIG. 1 illustrates an example non-limiting system that facilitates border detection in videos, in accordance with various aspects and implementations described herein.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

It is to be appreciated that in accordance with one or more aspects or implementations described in this disclosure, users can opt-out of providing personal information, demographic information, location information, proprietary information, sensitive information, or the like in connection with data gathering aspects. Moreover, one or more aspects or implementations described herein can provide for anonymizing collected, received, or transmitted data.

It is further to be appreciated that while the one or more aspects or implementations described below have been enunciated in terms of black borders, because black borders surrounding video are the most common case, it will be appreciated by those of ordinary skill that other border colors can also be detected with equal facility by the subject application. Moreover, it will also be appreciated by those of ordinary skill that borders that are, or include, variegated, polychromatic, multicolored, tessellated, or patterned formations can also be detected by the techniques of the subject disclosure.

Many videos uploaded to video-sharing or media-sharing websites have constant color borders, for instance, top and bottom black bars can be associated with each frame included in an uploaded video. Additionally and/or alternatively, black bars can also be associated with each frame included in the uploaded video, wherein a black bar, for instance, can extend down the right and/or left periphery of each frame included in the uploaded video.

Detection of such borders can be useful in multiple ways. For example, a user may want to crop or trim the borders produced by some video software because such borders are not desired to be shown during playback as that can take up space for true video. Also, with respect to video quality analysis, the border region can bias or skew the video quality metrics because a solid color, from the perspective of such video quality metrics, typically falsely implies that the task of transcoding from one media format to another will be less onerous.

In accordance with a non-limiting outline, the disclosure sets forth a method, comprising, using at least one microprocessor to execute computer executable instructions stored on at least one non-transitory computer readable medium to perform acts, such as detecting a line number (e.g., a line number of a row of pixels) in which a change between a border and a video area included in a frame associated with a video occurs. Generally, the line number can be, using a top border as an example, the distance between the peripheral edge of the border and the point at which the border abuts video content. The method also includes updating the line number in response to a difference in the line number associated with the change between the border and the video area included in a subsequent frame included in the video. The change between the border and the video area can be marked by a change in luminance (Y) values or change in chroma (U) or (V) values between the border and the video area. The border can be black and can be one of a top border, a bottom border, a right border, or a left border associated with the frame.

Additionally, the method includes removing the border from the video area over an entirety of the video as a function of the line number. The method can also include identifying equality between the line number associated with the frame and a line number associated with a subsequent frame over a plurality of frames included in the video, wherein in response to identifying the equality, the updating ceases updating the line number. The method also includes utilizing a threshold that accounts for a variation between the borders associated with the top of the frame and the bottom of the frame, wherein the threshold is set (or predetermined) to a size of a macroblock.

Further, the method also includes employing a limit that accounts for a differential between the borders associated with the right side of the frame and the left side of the frame, wherein the limit is set to a size of a macroblock. The method can also include deriving a video quality metric as a function of an original frame and a transcoded frame. Deriving a video quality metric can include resizing the original frame to the size of the transcoded frame, detecting the line number in which the change between the border and the video area included in the original frame and the transcoded frame occurs, and removing the border from each of the original frame and the transcoded frame. Additionally and/or alternatively, the method can also include deriving the video quality metric as a function of the original frame without the border and the transcoded frame without the border.

In accordance with a further non-limiting synopsis, the disclosure outlines a system, comprising at least one non-transitory computer readable medium having stored thereon computer-executable components and at least one microprocessor that executes the computer executable components stored on the at least one non-transitory computer readable medium. The system can include a detector component that employs a variable associated with a line number ascertained as a function of a change in luminance values and/or chroma values associated with a border and a video area associated with a frame included in a resized original video or a resized transcoded video. Further, the system can include a refinement component that updates the variable as function of a change in the line number ascertained as the function of the change in luminance values and/or chroma values associated with the border and the video area associated with the frame and a subsequent frame included in the resized original video or the resized transcoded video. Additionally, the system can include a trimming component that separates the border from the video area of the resized original video or the resized transcoded video.

The refinement component as set forth above can cease updating the variable in response to ascertaining that the line number remains unchanged between the line number ascertained as the function of the change in luminance values and/or chroma values associated with the border and the video area associated with the frame and the subsequent frame included in the resized original video or the resized transcoded video. The refinement component can also employ a threshold that accounts for a variation between the border associated with a top of the frame or a bottom of the frame or the subsequent frame included in the resized original video or the resized transcoded video. Additionally, the refinement component can utilize a limit that accounts for a differential between the border associated with a right side of the frame or a left side of the frame or a subsequent frame included in the resized original video or the resized transcoded video.

Additionally, the system can also include a comparator component that compares a metric ascertained as a function of the resized original video and/or the resized transcoded video.

In accordance with a further non-limiting overview, the disclosure describes a system, comprising at least one non-transitory computer readable medium having stored thereon computer-executable components and at least one microprocessor that executes computer executable-components stored on the at least one non-transitory computer readable medium. The system can include a refinement component that updates a variable as a function of a change in a line number ascertained in response to a change in luminance values and/or chroma values associated with a black border and a video area associated with a frame and a subsequent frame included in a resized original video or a resized transcoded video. Additionally, the system can include a trimming component that, as a function of the variable, separates the black border from the video area of the resized original video or the resized transcoded video.

The system can include a scaling component that sizes the frame included in an original video and the frame included in a transcoded video to ensure that a pixel in the frame in the original video aligns with a pixel in the frame in the transcoded video. The scaling component also sizes a subsequent frame included in the original video or the subsequent frame included in the transcoded video to ensure that a pixel in the subsequent frame in the original video aligns with a pixel in the subsequent frame in the transcoded video. Additionally, the system can also include a comparator component that ensures a consistency between results of a video quality metric derived as a function of a frame in the resized video and a frame in the transcoded video. The consistency between the result of the video quality metric derived as a function of a frame in the resized video and a frame in the transcoded video is ascertained subsequent to separation of the black border from the video area of the resized original video or the resized transcoded video.

Turning now to the drawings, with reference initially to FIG. 1, a non-limiting depiction of a border detection system 100 that detects a border included in a frame associated with a video is presented. Aspects of the systems, apparatuses, or processes explained in this disclosure can constitute machine-executable components embodied within machine (s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described. Border detection system 100 can include memory 106 for storing computer executable components and instructions. A processor 104 can facilitate operation of the computer executable components and instructions by the border detection system 100.

In an aspect, border detection system 100 can include interface component 102, processor 104, memory 106, and storage component 108. Border detection system 100 represents a system employed on one or more server computers or devices which detects a border included in a frame associated with a video. In an aspect, storage component 108 can store content such as video files. Interface component 102 successively gathers or obtains frames associated with an input video (e.g., video 110). As will be appreciated by those of ordinary skill, video 110 can comprise many multiple frames.

Border detection system 100, in association or in conjunction with processor 104, memory 106, and storage component 108, obtains frames associated with a video (e.g. video 110) using interface component 102, wherein each frame included in the video input 110 is subjected to an analysis to differentiate border areas (e.g., a colored border) from video areas. Border detection system 100 accomplishes the differentiation between the border areas and the video areas for each frame included in the input video, by ascertaining the line or row (or in the case of left and/or right borders included in the frames-columns) in which there is a change in luminance value (Y) and/or chroma (U) or (V) values. Where a change in luminance value or chroma values is noted by border detection system 100, the previous line or row is identified as being the furthest extent for the border for a particular frame included in the video.

The process of identifying the demarcation between the border area and the video area can be performed for all frames included in the video, or for sufficient frames to ensure that there is no deviation or at the very least minimal deviation between the noted line or row number at which the boundary between the border area and video content is found for the entirety of the video. For instance, consider a video that includes five frames, wherein each frame comprises, for simplicity of exposition, only a top border. Border detection system 100 can analyze the first frame of the video and ascertain that the row or line in which there is a detected luminance change or change in chroma values marking a demarcation between the border and the video content is row or line 11, thus border detection system 100 can note that the width or extent of the border area in the first frame is from lines or rows 0-9. Border detection system 100 can then investigate the second and third frames, wherein border detection system 100 might determine that the rows or lines in which a change in luminance or chroma takes place is also line 11, border detection system 100 can thereafter surmise that, like the detected border area in the first frame, the border area for subsequent frames included in the input video will also have a border area that extends from lines or rows 0-9. At this point, border detection system 100 having identified a consistent border area for the first three frames can desist from analyzing the subsequent frames, in the assumption that the border width or extent for any subsequent frame will not deviate from the identified border area for the first three frames.

It should be noted that border detection system 100 determines the border extent or width to ensure that no video content is inadvertently associated with the border area. Thus, in the context of a video comprising four frames, border detection system 100 can have determined that the border associated with the first frame extends from lines or rows 0-8, the border associated with the second frame extends from lines or rows 0-11, the border associated with the third frame extends from lines or rows 0-10, and the border associated with the fourth frame extends from lines or rows 0-14, border detection system 100 can thus ascertain that the maximum extent or width of the detected border for all frames included in the input video should be from lines or rows 0-8 to ensure that no video content is identified and included as belonging to the border area. In this manner no video content is included in the detected border area for the video in its entirety.

Once border detection system 100 has ascertained the extent or width of the borders associated with each frame included in the video, border detection system 100 can perform a correction process on the final border detection, on the understanding that most videos have symmetric borders, if any. Thus border detection system 100 makes an allowance for a small difference between top and bottom borders and, if present, between left and right borders. Generally, a small threshold value or limit is utilized by border detection system 100, typically this value is set to 4 pixels because this is usually the size of a macro block, and the border area may not be the border color at the boundary or demarcation where it abuts or comes in contact with video content, because the pixel color associated with video content and/or the border area can blend or bleed into one another over the course of encoding the video and/or during the process of transcoding the video from a first video format to a second video format.

To accomplish the foregoing therefore, border detection system 100, in accordance with a non-limiting aspect, can employ the code sequence listed below, wherein for each frame: top, bottom, left, and/or right borders (in terms of number of pixels) are updated with the current frame. The update sequence of the four borders can be arbitrary. The assumptions on the border regions are: (i) border pixel colors are typically "black"; for videos, the luminance value (Y) of "black" is possibly around 0, 16, or 32 and the chroma values (U) and (V) are generally around 128; and (ii) the difference between max(Y) and min(Y) of pixels in the border region should not be significant (e.g., although the luminance value of a "black" pixel can be around 0, or 16, or 32, it should be consistent for each frame included in the video in its entirety). The steps of updating the borders, using the top border as an example, are:

// Returns updated border
int UpdateBorder(top, frame)
For line i between line 0 and top:
   Check whether each pixel in the line is "black":
   Y<max_y_thres &&
   U-128<chroma_thres &&
   V-128<chroma_thres
   If any pixel in this line is not "black", return i-1 as updated border
   Get min and max Y of pixels and this line, minY_i and maxY_i
   Update current minY and maxY of the whole border region:
   minY=min(minY, minY_i)
   maxY=max(maxY, maxY_i)
If maxY−minY>max_y_diff_thresh, return i-1
Return top
}

As noted above, when border detection system 100, while executing the above code fragment, encounters the following two conditions: (a) in response to the detected borders remaining consistent over a number of frames, execution of the foregoing code segment is skipped for the remainder of the frames included in the video (e.g., border detection system 100 is sufficiently confident that subsequent frames will not deviate from the determined border width) and the detected borders are returned; and/or (b) all the frames included in the video have been analyzed.

One use to which the disclosed border detection system 100 can be put to is to crop or trim the borders from original videos and/or transcoded (e.g., the direct digital-to-digital data conversion of one encoding to another) videos, so that reference quality metrics, such as peak signal to noise ratio (PSNR), structural similarity (SSIM), etc. can have a more accurate metric calculation without inclusion of the borders associated with each frame included in the video (e.g., original videos and/or transcoded videos). To this end, border detection system 100 can verify border detection between an original video formatted using a first media format and its transcoded counterpart transcoded into a second video format. To accomplish such verification of border detection between the original video and its transcoded counterpart, border detection system 100, instead of directly detecting border areas on the original video and transcoded video, can initially scale or resize each frame associated with the original video and transcoded video to a desired resolution. The desired resolution is typically selected to ensure: ease of calculation using the video quality metrics; and pixel alignment between the original video and its transcoded counterpart, because transcoded videos can, in many instances, have lower resolutions than their original counterparts. Once border detection system 100 has resized frames associated with each of the original video and the transcoded counterpart video, for each of the resized frames included in the original video and/or the transcoded video, border detection system 100 can perform border detection as elucidated above. By initially scaling each of the original video and transcoded video prior to performing border detection, border detection system 100 ensures that the original video and the transcoded counterpart align in pixels after scaling and cropping, which it has been found to be crucial for video quality metrics calculations.

Figure 2:
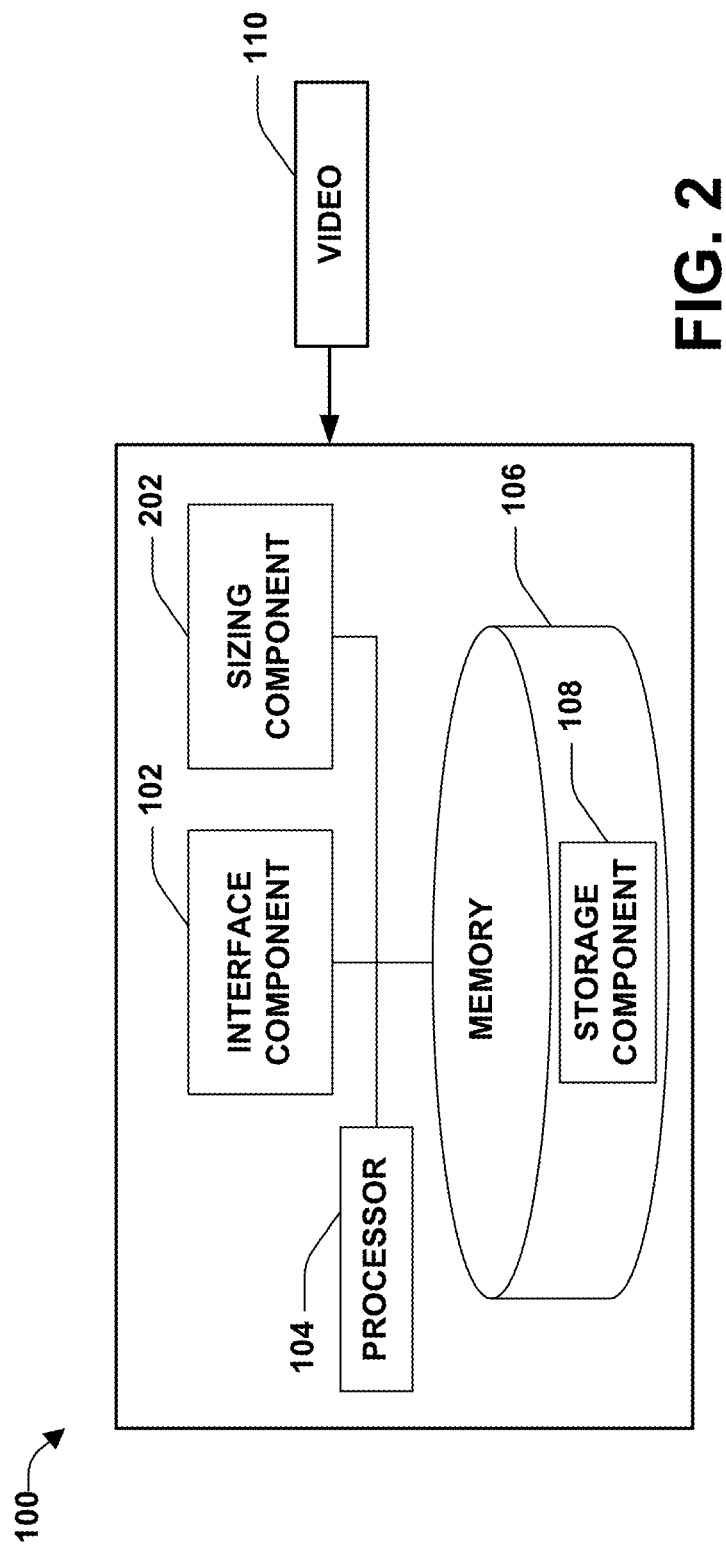
FIG. 2 illustrates an example non-limiting depiction of a system for border detection that can be utilized to resize each frame associated with an original video and/or a transcoded video, in accordance with various aspects and implementations described herein.

FIG. 2 provides a further non-limiting illustration of border detection system 100. As illustrated, border detection system 100 can include, in addition to interface component 102, sizing component 202 that can be utilized to resize each frame associated with the original video and/or the transcoded video (e.g., the supplied video, video 110) to a desired resolution. As has been noted above, the desired resolution is typically selected or chosen to ensure ease of calculation using the video quality metrics, and/or pixel alignment between the original video and a transcoded video, for example. Resizing or scaling videos to a desired resolution is typically performed because transcoded videos, in many instances, have lower resolutions than their original counterparts.

Figure 3:
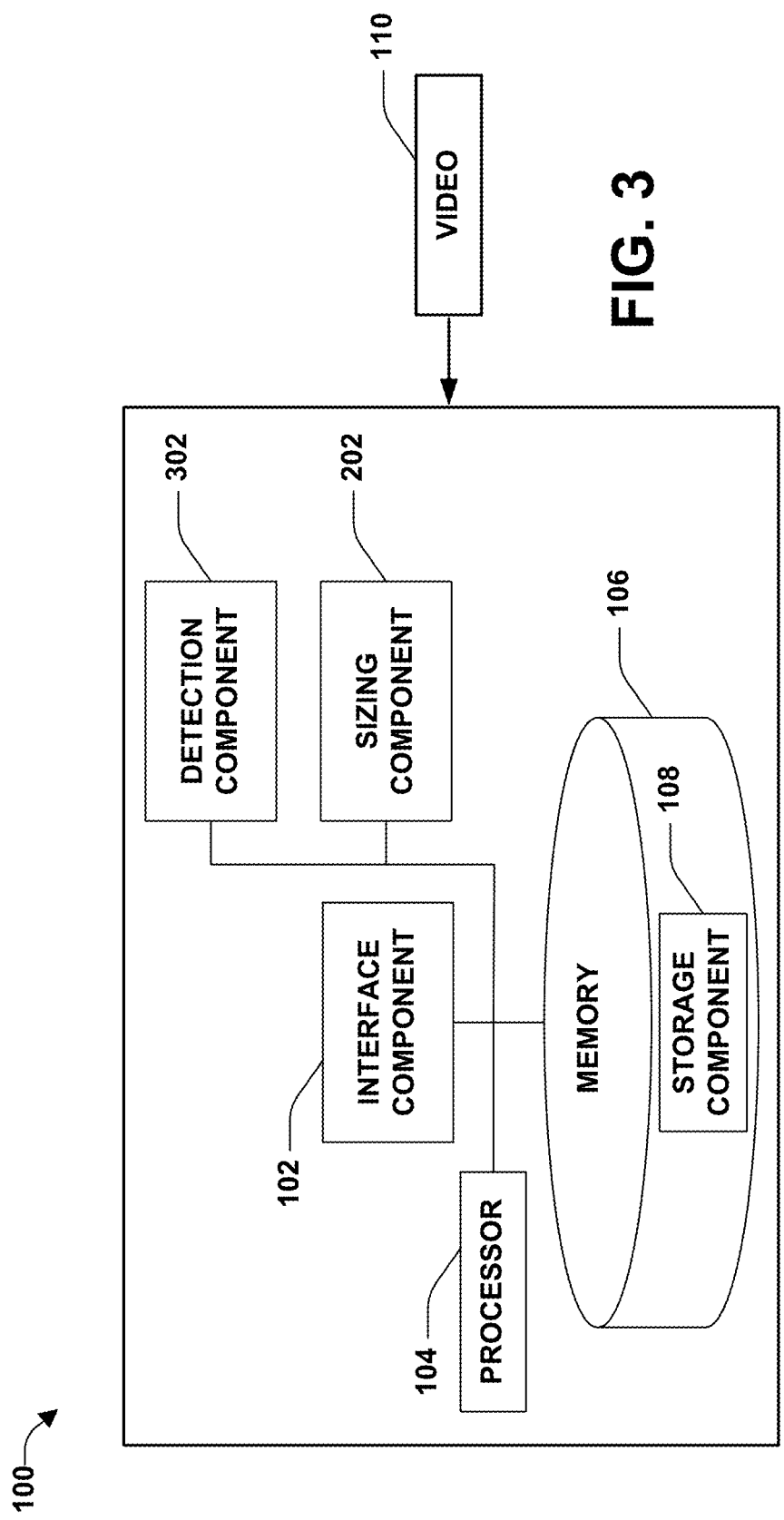
FIG. 3 illustrates an example non-limiting depiction of a further system for border detection that can be utilized to ascertain the border widths associated with one of the top border, the bottom border, the right border, and/or the left border, in accordance with various aspects and implementations described herein.

Turning now to FIG. 3 that provides a further non-limiting illustration of border detection system 100. As illustrated, border detection system 100, in addition to interface component 102 and sizing component 202, can include detection component 302. Detection component 302 can be utilized to ascertain the border widths or the border extent associated with one of the top border, the bottom border, the right border, and/or the left border associated with each frame included in a supplied video (e.g., video 110). Detection component 302 subjects each frame associated with the supplied video to an analysis to differentiate border areas (e.g., black or other colored borders) from video content areas. Detection component 302 accomplishes this differentiation between border areas and video content areas by ascertaining the line or row (or in the case of left and/or right borders included in the frames—columns) in which there is a change of luminance value (Y) and/or chroma values (U) or (V). Where detection component 302 detects a change in luminance value and/or chroma values, detection component 302 can utilize the previous line or row (or for the purposes of left and/or right borders—previous column) as being the maximum extent or the greatest width associated with the border for a particular frame included in the video.

The process of identifying the demarcation between the border area and the video content area can be performed for all frames included in the video, or for sufficient frames to ensure that there is no deviation or, at the very least, minimal deviation between the noted line or row number (or for purposes of left and/or right borders—noted column number) at which the boundary between the border area and the video content area is found over the entirety of the video. Thus for instance, detection component 302 can analyze a first frame of a video to ascertain the row or line number in which there is a detected luminance change or chroma change that marks the boundary between the border and the video content within the first frame. Where detection component 302 identifies a luminance change and/or chroma change within the first frame, detection component 302 can note that the previous line within the first frame marks the greatest width of the detected border within the first frame, because this line or row is comprised solely of the border color. Detection component 302 can thereafter process subsequent frames in a similar manner, noting for each frame the greatest extent or width of the border for each of the subsequent frames.

Figure 4:
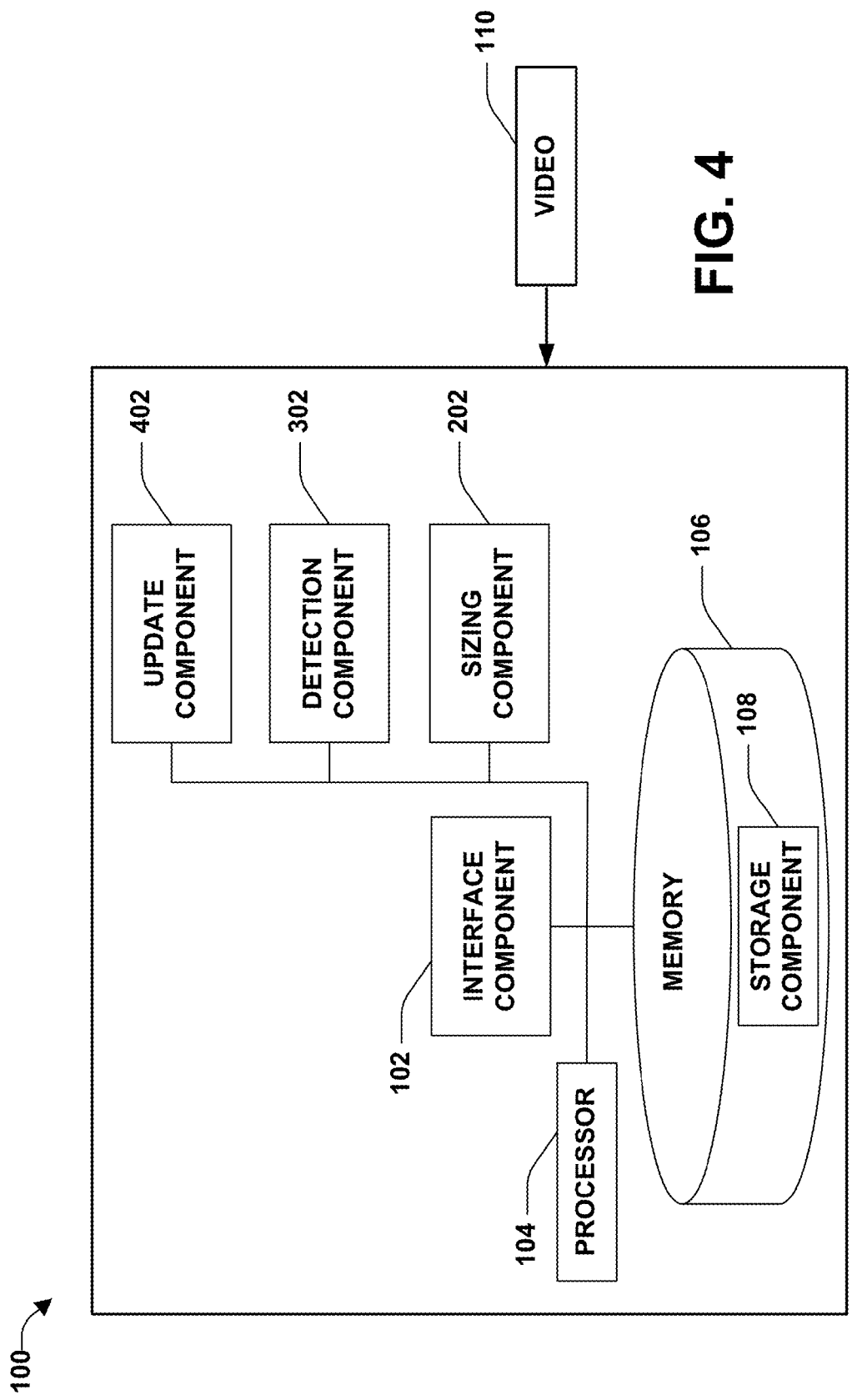
FIG. 4 illustrates an example non-limiting depiction of another system for border detection wherein the system ascertains the widths of the borders for the entire video, in accordance with various aspects and implementations described herein.

FIG. 4 provides a further non-limiting illustration of border detection system 100 that includes update component 402. Update component 402, as a function of input provided by detection component 302, can ascertain the width of the borders for the entire video. For instance, in the context of a five frame video and a top border associated with each of the five frames, detection component 302 can have ascertained that a luminance change or chroma change respectively occurred in lines 8, 12, 13, 7, and 15 of the five frames, and thus can infer that the respective maximal extent of the top border area for each frame is 7, 11, 12, 6, and 14. Upon receipt of this data from detection component 302, update component 402 can ascertain that for the entirety of the five frames that comprises the video that lines 0-6 should be associated with the top border for all frames included in the video. By associating lines 0-6 with the border area (in this instance the top border) no video content is inadvertently included in the border area, and thus should the borders subsequently be cropped from the video content area, none of the video content area will inadvertently be cropped or trimmed with the border areas; only the area certifiably associable with the border area will be trimmed or cropped.

Figure 5:
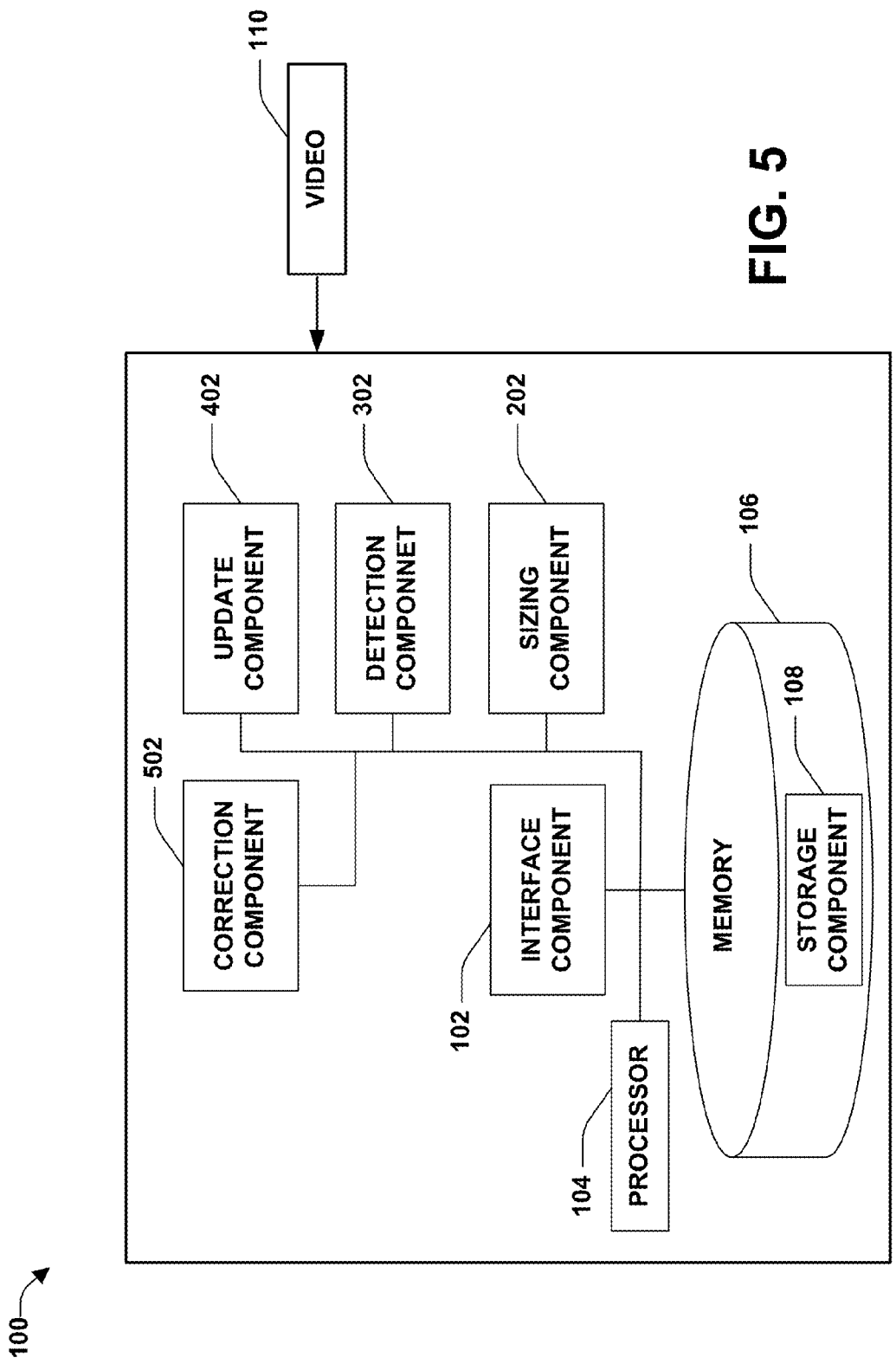
FIG. 5 illustrates an example non-limiting depiction system for border detection wherein the system performs a correction process on final border detection, in accordance with various aspects and implementations described herein.

FIG. 5 provides yet a further non-limiting illustration of border detection system 100 that includes correction component 502 that in concert with detection component 302 and update component 402 can perform a correction process on the final border detection, on the understanding that most videos have symmetric borders, if any. Thus, correction component 502 can make allowances for small differences between top and bottom borders and, if present, between left and right borders. Typically, a small threshold value is utilized, typically this limit is set to the size of a macro block. Generally, the small threshold is selected because the border area may not be the border color at the periphery where the border comes in contact or abuts the video content area, because the pixel color associated with the video content and/or the border area can blend or bleed into one another over the course of encoding the video and/or during the process of transcoding the video from a first video format to a second video format.

Figure 6:
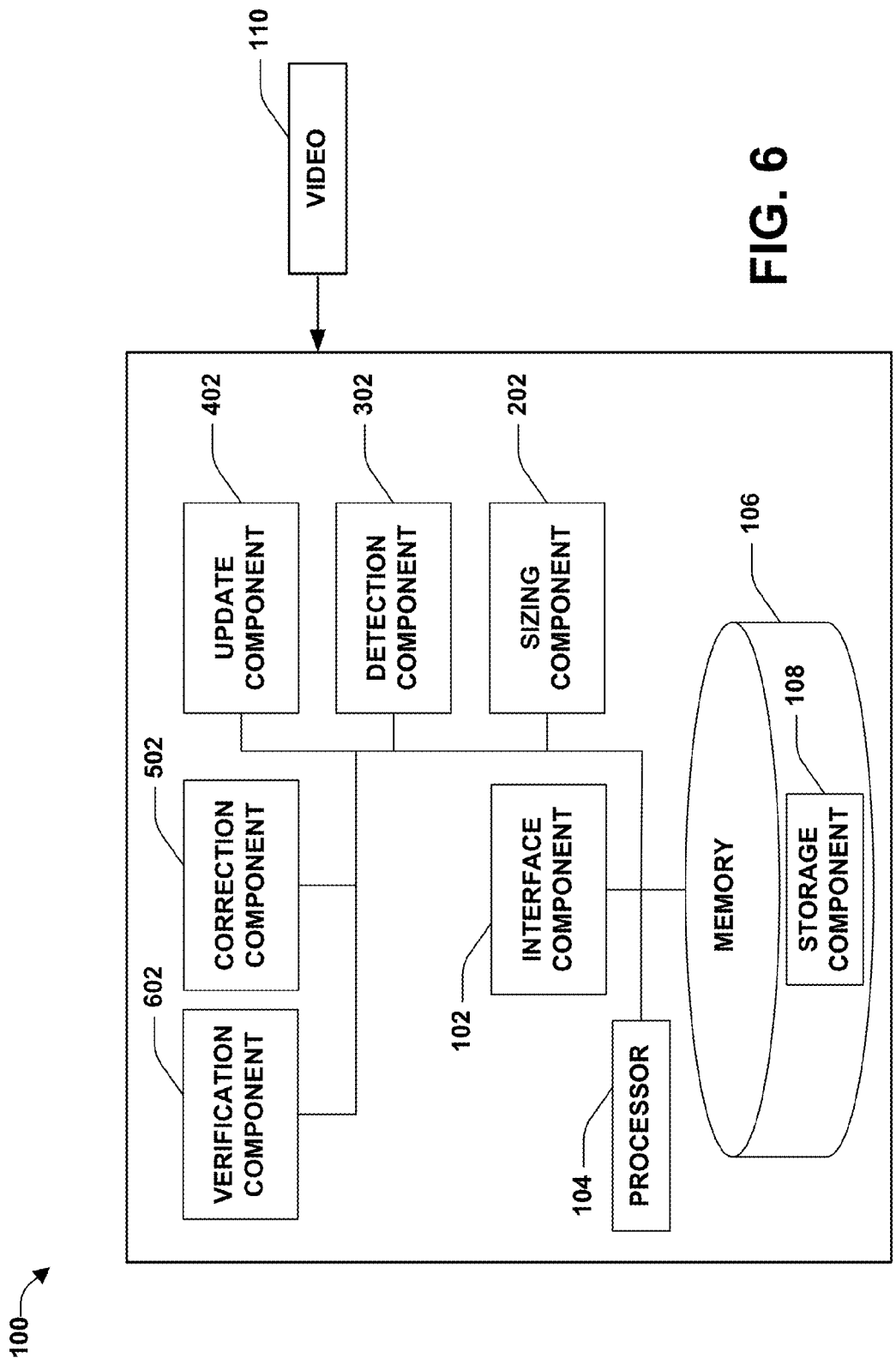
FIG. 6 illustrates an example non-limiting system that facilitates border detection wherein the system validates border detection between an original video and a video transcoded as a function of the original video, in accordance with various aspects and implementations described herein.

FIG. 6 provides a further non-limiting depiction of border detection system 100 that includes verification component 602 that, in accordance with a non-limiting aspect, can be utilized to validate border detection between an original video and a video transcoded as a function of the original video. Verification component 602 can take as input an original video and a video that has been transcoded as a function of the original video, and thereafter, through the use of video quality metrics, such as peak signal-to-noise ratio (PSNR), structural similarity (SSIM), and the like, can ascertain whether or not the transcoded video mirrors the original video. In order to facilitate such comparisons between the original video and its transcoded counterpart, verification component 602 can employ the facilities provided by a comparator component.

Figure 7:
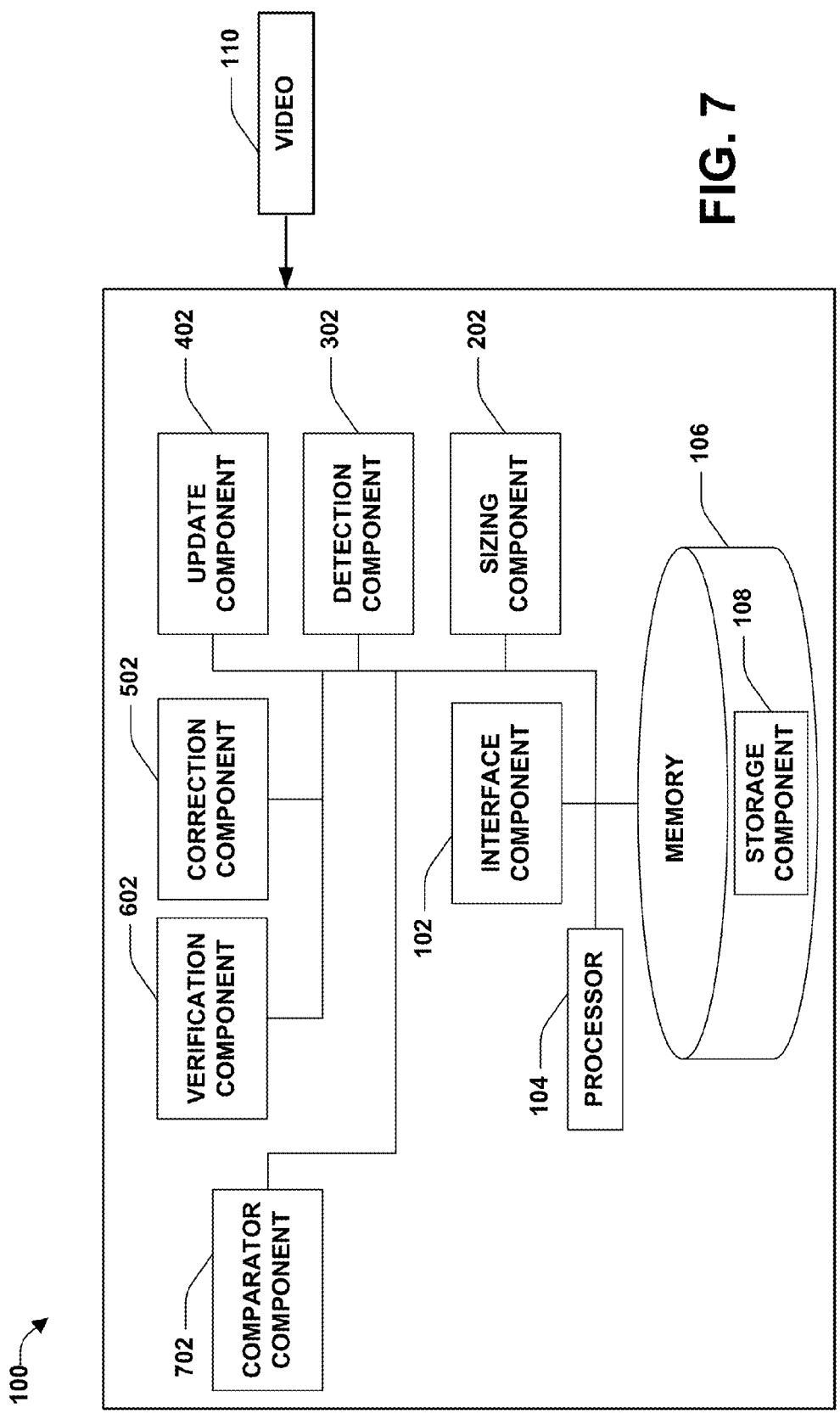
FIG. 7 illustrates an example non-limiting system that facilitates border detection wherein the system utilizes video quality metrics derived as a function of frames included in an original video and a transcoded video, in accordance with various aspects and implementations described herein.

FIG. 7 provides a further non-limiting illustration of border detection system 100 that includes comparator component 702 that can utilize video quality metrics derived as a function of frames included in an original video and a transcoded video. Comparator component 702 takes advantage of having two versions of the same video, by utilizing sizing component 202, detection component 302, update component 402, and correction component 502 to detect the borders on each video (the original video and the transcoded video) independently, cropping or trimming the identified border areas from the video content areas, deriving one or more video quality metric as a function of frames included in the original video and the transcoded video, and thereafter comparing whether the derived results are consistent.

Figure 8:
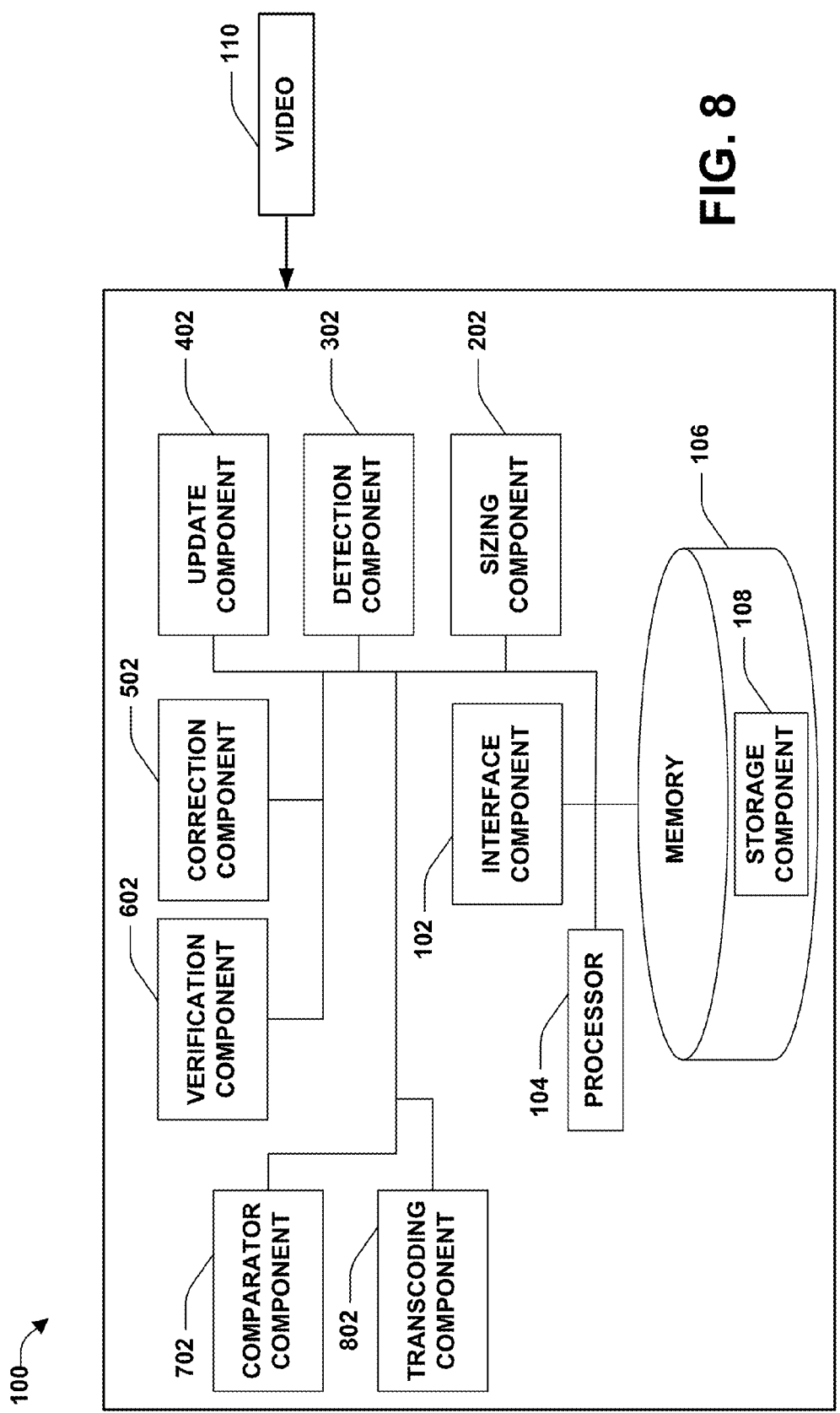
FIG. 8 illustrates an example non-limiting system that facilitates border detection wherein the system transcodes a video from a first video format into a video in a second video format, in accordance with various aspects and implementations described herein.

FIG. 8 provides yet a further non-limiting illustration of border detection system 100 that includes transcoding component 802 that can be used in concert with sizing component 202, detection component 302, update component 402, correction component 502, verification component 602, and comparator component 702 to transcode a video from a first video format into a video in a second video format. In this instance, a video in a first video format can analyzed frame by frame to identify the ambit of the borders associated with each frame in the video, and thereafter establish a maximal consistent extent that the border should cover for the entirety of the video. Based on the results yielded by utilization of sizing component 202, detection component 302, update component 402, and correction component 502, verification component 602 and/or comparator component 702 can be utilized strip the surrounding borders from the video content, at which point transcoding component 802 can be employed to convert the video content from a first video format to a second video format. By stripping the borders from the video content, trancoding the video to a second video format, and subsequently utilizing video quality metrics on each of the original video (e.g., without its associated borders, if any) and the transcoded video (e.g., transcoded from the first video format to the second video format without the borders associated with the original), the resultant video quality metrics are not biased or skewed as a consequence of the existence of the surrounding border areas.

Figure 9:
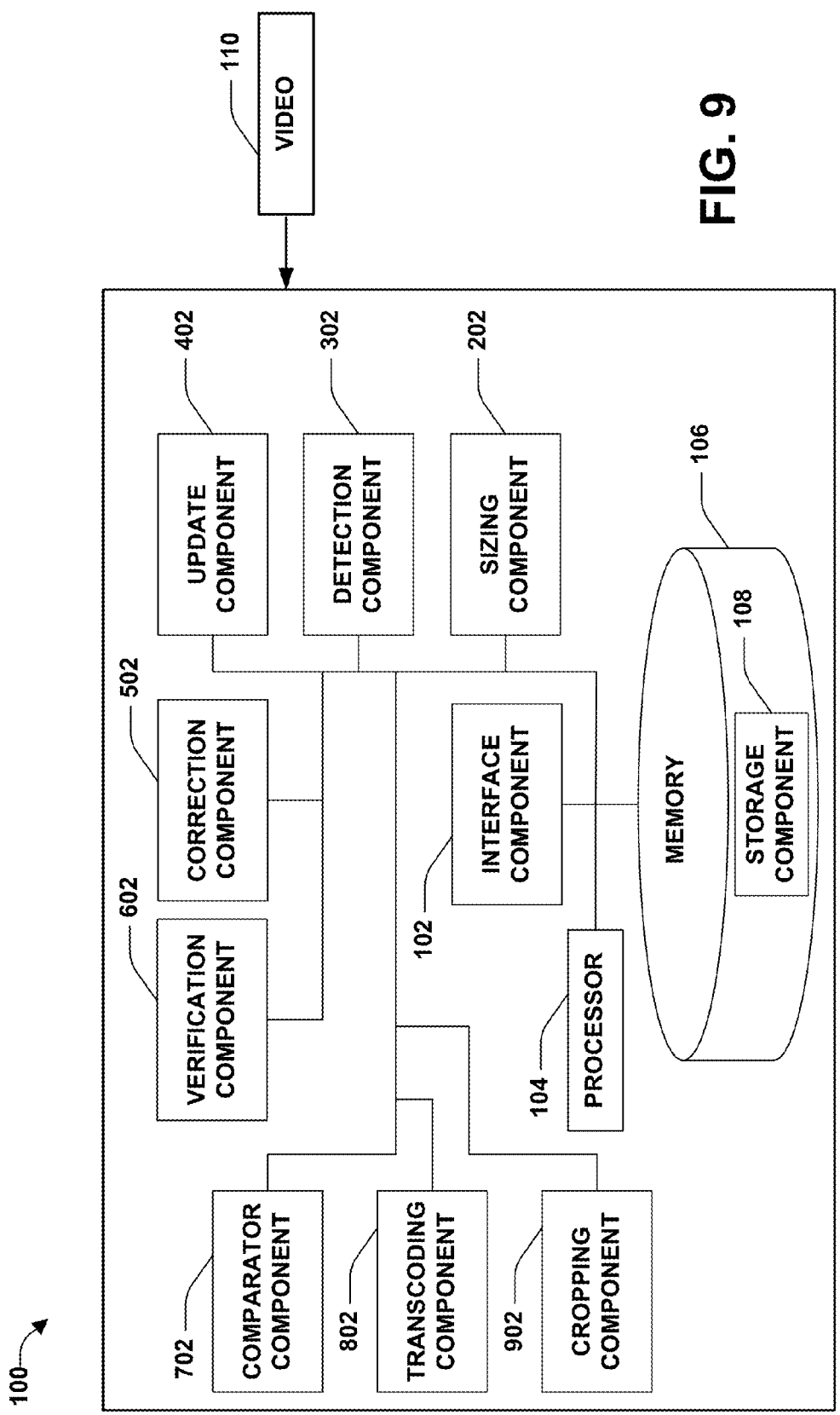
FIG. 9 illustrates an example non-limiting system that facilitates border detection wherein the system crops, strips, or trims borders from video content associated with videos, in accordance with various aspects and implementations described herein.

FIG. 9 provides a further non-limiting representation of border detection system 100 that includes cropping component 902 that can be used in association with detection component 302, update component 402, and correction component 502 to crop, strip, or trim borders from video content associated with videos input into the system. As has been elucidated above detection component 302, update component 402, and correction component 502 can be utilized to identify the border areas that are contiguous, or in contact, with the video content. With this information regarding the border areas and the border areas in contiguity with the video content, cropping component 902 can separate or partition the identified border areas from the video content areas in accordance with the findings provided by detection component 302, update component 402, and correction component 502.

Figure 10:
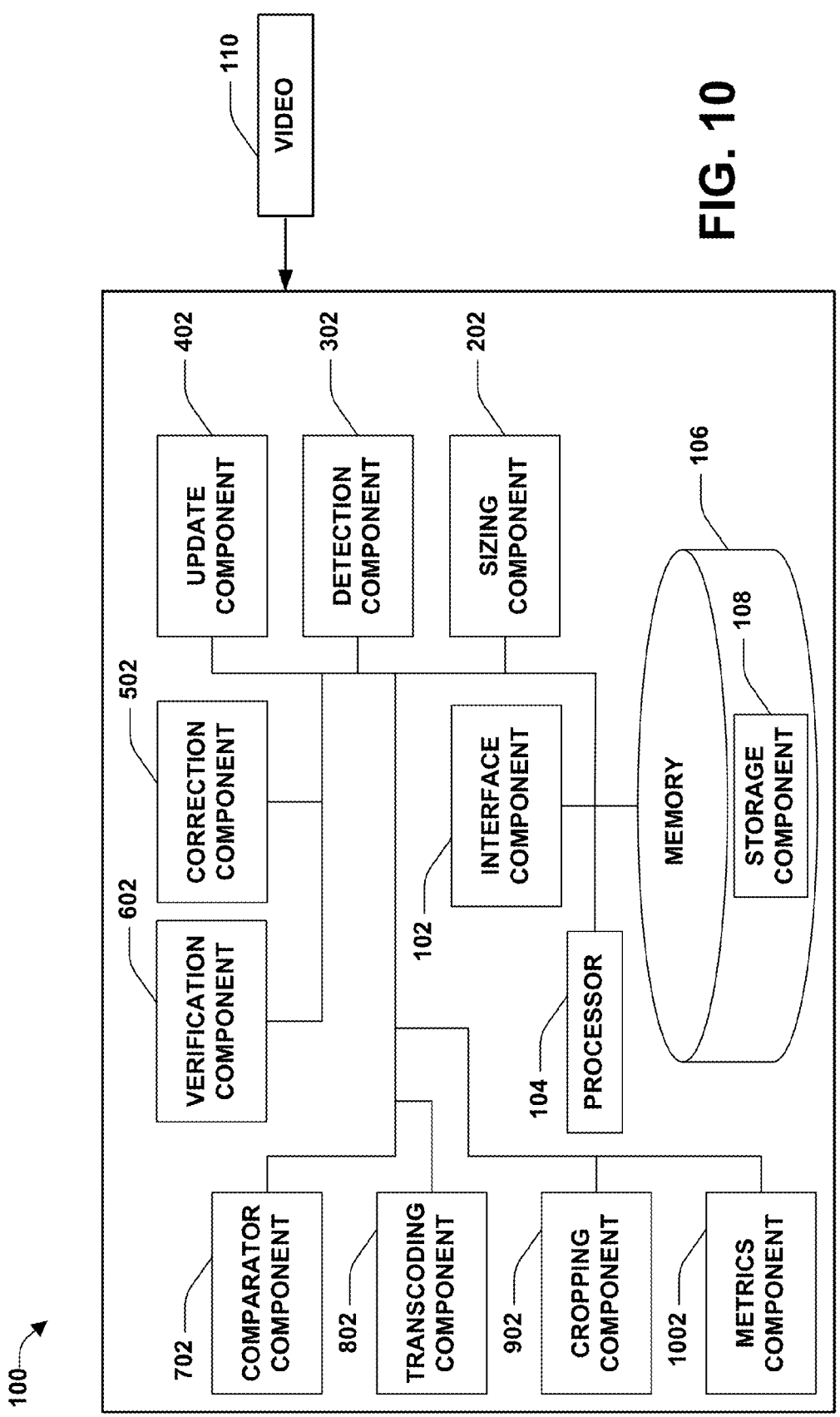
FIG. 10 illustrates an example non-limiting system that facilitates border detection wherein the system can be employed to derive video quality metrics as a function of one or more input video, in accordance with various aspects and implementations described herein.

FIG. 10 provides a further non-limiting depiction of border detection system 100 that includes metrics component 1002 that can be employed to derive video quality metrics, such as peak signal-to-noise ratio (PSNR), structural similarity (SSIM), etc. as a function of one or more input video (e.g., video 110). Derivation of such video quality metrics, subsequent to identifying or detecting the borders associated with frames included in the videos, and thereafter stripping the borders from the associated video content can ensure that the video quality metrics achieve consistent results given that video quality metrics when derived from videos that have not been trimmed of their borders can be biased.

Figure 11:
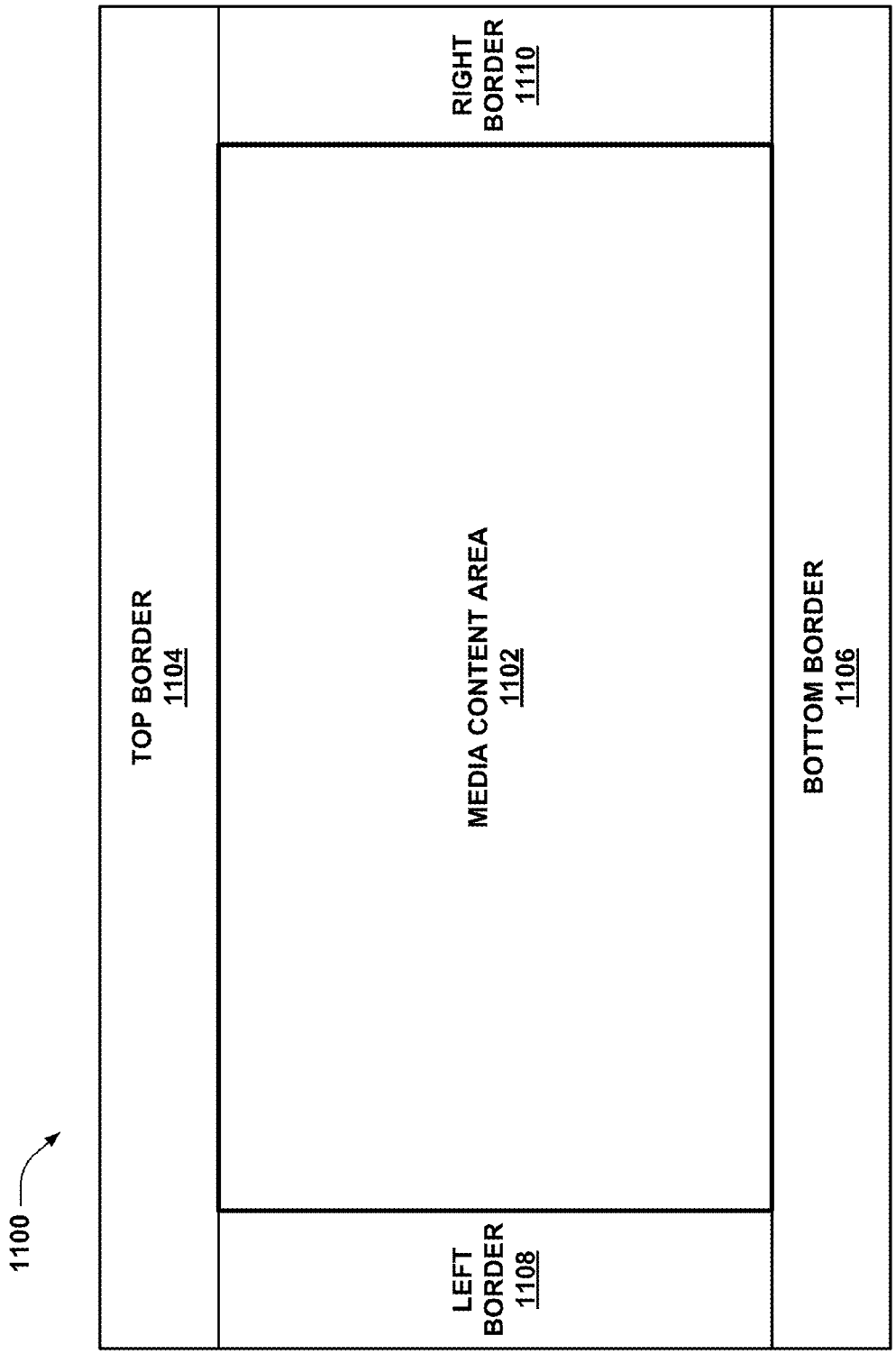
FIG. 11 provides a non-limiting representation of a frame comprising a video area, a top border, a bottom border, a left border, and right border, in accordance with various aspects and implementations described herein.

FIG. 11 provides a non-limiting representation of a frame 1100 comprising a video content area 1102, top border 1104, bottom border 1106, left border 1108, and right border 1110. Frame 1100 typically can be one of many frames included in a video, wherein each frame, if a border is present, includes at least a top border 1104 and/or bottom border 1106. Further, where top border 1104 and/or bottom border 1106 are present, frame 1100 can also include left border 1106 and/or right border 1110. As will be appreciated by those of ordinary skill, top border 1104, bottom border 1106, left border 1108, and/or right border 1110 can generally be contiguous to video content area 1102, wherein video content area 1102 is designated as the area within which video content can be presented for display.

Figure 12:
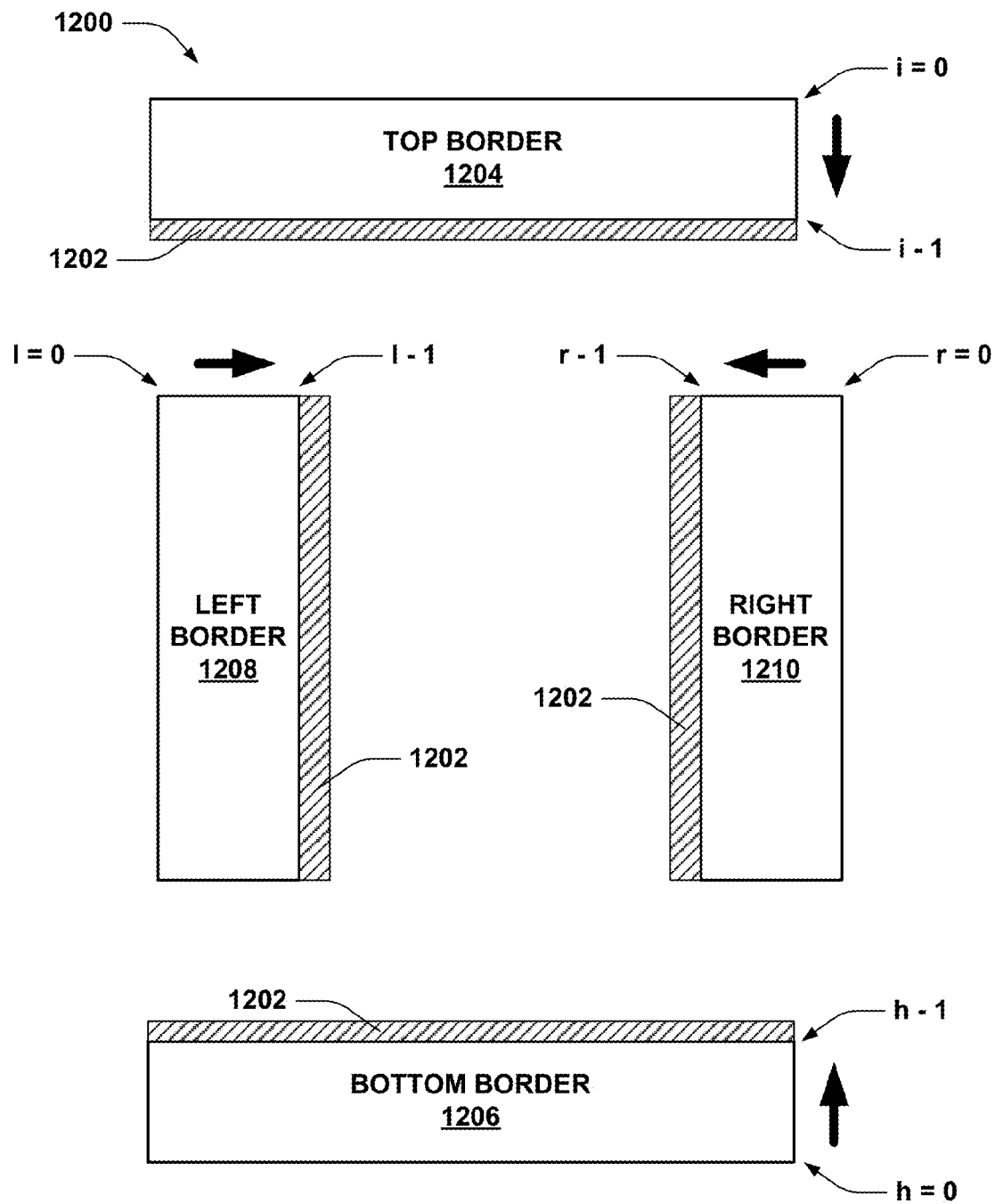
FIG. 12 provides a further non-limiting representation of a frame comprising a top border, a bottom border, a left border, and a right border, wherein each of the top border, the bottom border, the left border, and the right border adjoin the video area, in accordance with various aspects and implementations described herein.

FIG. 12 provides a further non-limiting representation of a frame 1200 comprising top border 1204, bottom border 1206, left border 1208, and right border 1210, wherein each of the top border 1204, bottom border 1206, left border 1208, and right border 1210 adjoin, contact, abut, are contiguous with, or are in close proximity to video content area 1202. As depicted in FIG. 12 upon application of the facilities provided by border detection system 100 (as expounded upon above), border detection system 100 respectively identifies the border region by commencing from the periphery of the border (e.g., i=0; h=0, 1=0, or r=0, for each of the top border 1204, bottom border 1206, left border 1208, and right border 1210) and iterating inwards (e.g., towards the video content 1202, as respectively indicated by the arrows associated with each of the top border 1204, bottom border 1206, left border 1208, and right border 1210). When border detection system 100 identifies a change in luminance or chroma associated with crossing into the video content area 1202, border detection system 100 can associate the previous line (or column in the case of the left and right borders) as being the last line (or column) within which there was no discernible luminance or chroma change. Thus, as illustrated in FIG. 12 the lines (or columns) associated with each of the top border 1204, bottom border 1206, left border 1208, and right border 1210 where a luminance or chroma change has not been detected by border detection system 100 can respectively be: i-1, h-1, l-1, and r-1, which indicates the line number (or column number) associated with the maximum extent of the border.

In the context of the subject disclosure one or more further components (not shown) can be utilized and can aid in the various determinations and/or inferences upon which interface component 102, sizing component 202, detection component 302, update component 402, correction component 502, verification component 602, comparator component 702, transcoding component 802, cropping component 902, metrics component 1002, etc. can rely. In an aspect, an inference component (not shown) can aid in the determination or discernment of border areas from video content areas included in frames associated with a video. Further, such an inference component can be employed to provide suggested or recommended locations demarcating border areas from video content areas. In order to facilitate its aims, the inference component can examine the entirety or a subset of data to which it is granted access and can provide for reasoning about or inferring relevancy to and desirability of utilizing respective factors. The inference can be probabilistic—that is, the computation of a probability distribution over states of interest based on a consideration of data and events. An inference can also refer to techniques employed for composing higher-level events from a set of events or data.

Such inference can result in construction of new events or actions from a set of observed events or stored event data, whether or not the events are correlated in close temporal proximity, and whether the events and data come from one or several event and data sources. Various classifications (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

FIGS. 13-16 illustrate methodologies or flow diagrams in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Figure 13:
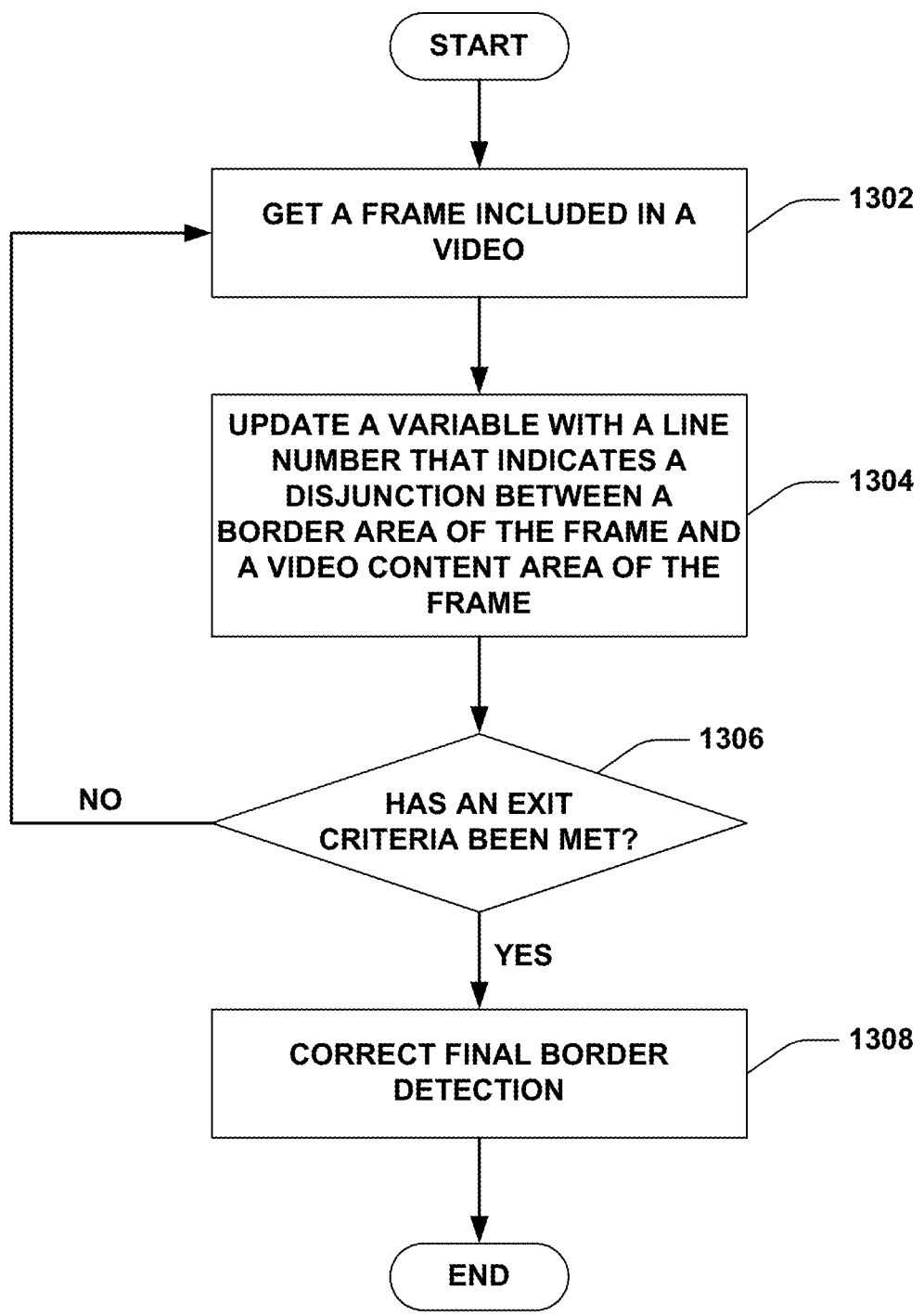
FIG. 13 illustrates an example methodology for border detection on videos, in accordance with various aspects and implementations described herein.

Referring now to FIG. 13, presented is a flow diagram of an example application of system disclosed in this description in accordance with an aspect. In an aspect, exemplary methodology 1300 of a system for border detection is stored in a memory and utilizes a processor to execute computer executable instructions to perform functions. At 1302 a frame can be obtained or is received (e.g., using interface component 102) from a supplied video (e.g., 110). At 1304 detection of a disjunction in luminance or chroma that identifies a contiguity between the border area and video content area can be identified for a frame included in the video (e.g., using detection component 302 and update component 402). At 1306 a query can be posited, by detection component 302 and/or update component 402, regarding whether or not an exit criteria has been met. The exit conditions can be where detection component 302 and/or update component 402 identify an inter-frame consistency regarding the width of the border for a set of frames included in the video, where the set is not a null set; or where detection component 302 and/or update component 402 ascertain that the entirety of frames included in the video have been analyzed. Where either one of the foregoing exit criteria have been satisfied at 1306, the method can proceed to 1308, wherein the final border detection can be corrected by correction component 502, wherein correction component 502 can employ a small threshold or limit (usually set to the size of a macro block) to ensure that the symmetry between the top and bottom borders and/or the left and right borders is maintained. Where either one of the foregoing criteria are not met at 1306, the method can return to 1302 to obtain a further frame from the input video (e.g., video 110).

Figure 14:
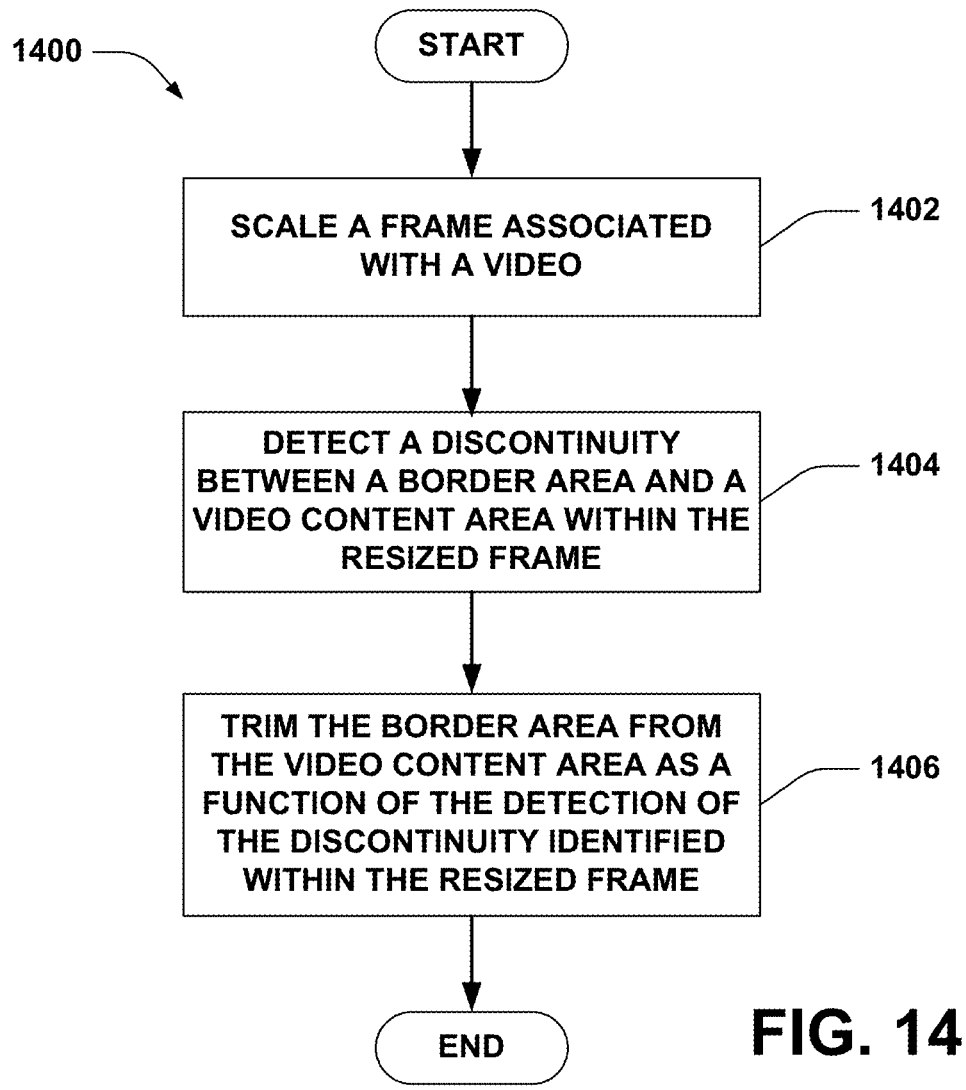
FIG. 14 illustrates an example methodology for border detection that scales a frame associated with a video, identifies a discontinuity between a border area and a video content area, and trims the video content area from the border area on the videos, in accordance with various aspects and implementations described herein.

Referring now to FIG. 14, presented is a flow diagram of another example application of system disclosed in this description in accordance with an aspect. In an aspect, exemplary methodology 1400 of a system for border detection is stored in a memory and utilizes a processor to execute computer executable instructions to perform functions. At 1402 a frame associated with an input video (e.g., video 110) can be scaled in resolution to ensure that pixel alignment between an original video and a transcoded video is maintained (e.g., using sizing component 202). At 1404 a discontinuity that exists between a border area and a video content area within the resized frame can be detected (e.g., using detection component 302, update component 402, and/or correction component 502). At 1406 the border area can be trimmed from the video content area as a function of the detection of the discontinuity identified within the resized frame (e.g., using cropping component 902).

Figure 15:
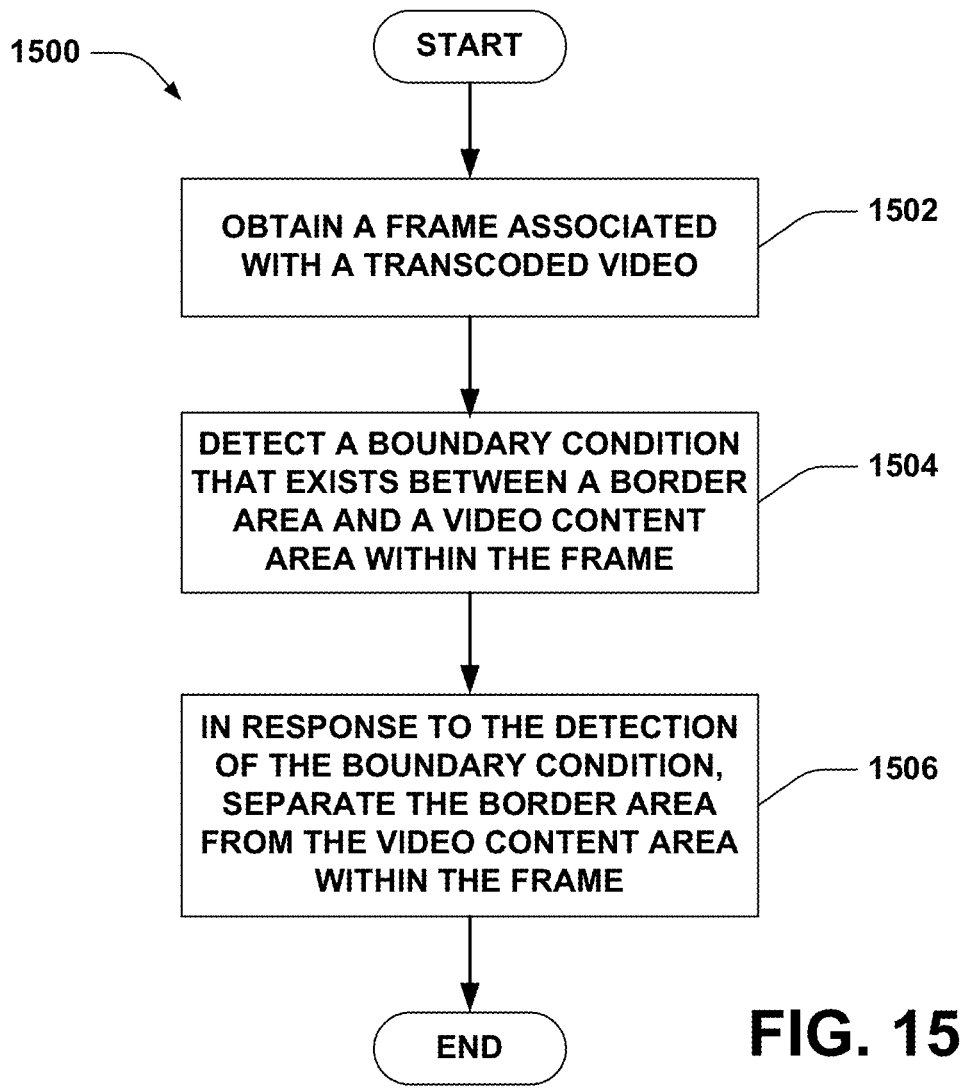
FIG. 15 illustrates an example methodology for border detection that resizes a frame associated with a transcoded video, detects a boundary condition between a border area and a video content area, and separates the border area from the video content area, in accordance with various aspects and implementations described herein.

Referring now to FIG. 15, presented is a flow diagram of an example application of system disclosed in this description in accordance with an aspect. In an aspect, exemplary methodology 1500 of a system for border detection is stored in a memory and utilizes a processor to execute computer executable instructions to perform functions. At 1502, a frame associated with a transcoded video (e.g., video 110) can be obtained, using interface component 102. At 1504, a boundary condition (e.g., a change in luminance and/or chroma values) that exists between a border area and a video content area within the frame can be detected (e.g., using detection component 302, update component 402, and/or correction component 502). At 1506, in response to the detection of the boundary condition, the border area within the frame associated with the transcoded video can be separated from the video content area.

Figure 16:
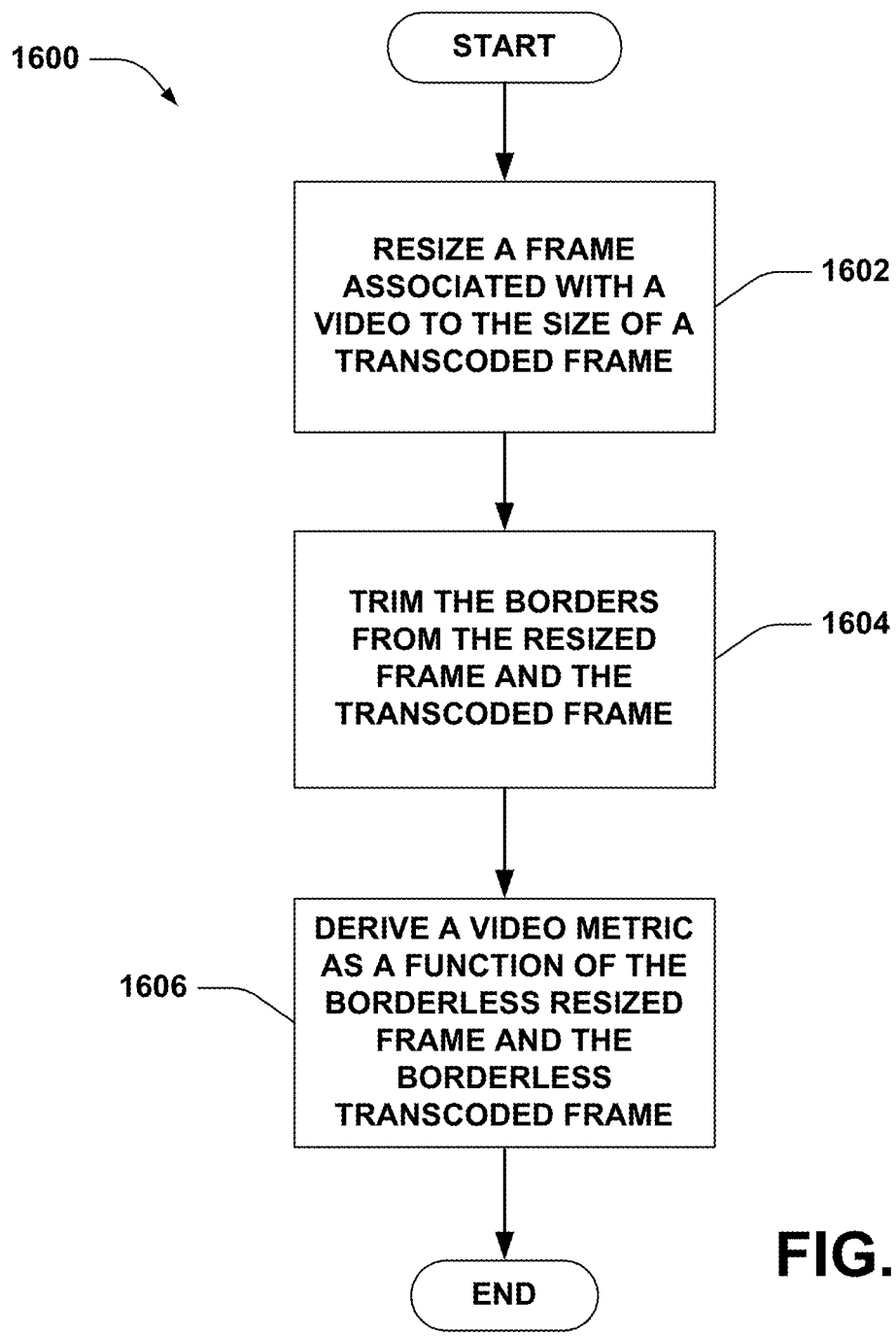
FIG. 16 illustrates an example methodology for border detection that resizes a frame associated with a video to a corresponding size of a frame associated with a transcoded video, trims the borders associated with the resized frame and the transcoded frame from the video content respectively included in the resized frame and the transcoded frame, and derives a video quality metric as a function of the borderless resized frame and the borderless transcoded frame.

With reference to FIG. 16, presented is a flow diagram of an example application of system disclosed in this description in accordance with an aspect. In an aspect, exemplary methodology 1600 of a system for border detection is stored in a memory and utilizes a processor to execute computer executable instructions to perform functions. At 1602 a frame associated with a video can be resized, by sizing component 202, to a corresponding size of a frame associated with a transcoded video. At 1604 the respective borders associated with the resized frame and the transcoded frame can be trimmed from the video content included in the resized frame and the transcoded frame through utilization of detection component 302, update component 402, correction component 502, and cropping component 902. At 1606 a video quality metric can be derived as a function of the borderless resized frame and the borderless transcoded frame. Derivation of the video quality metric can be performed by metrics component 1002, for example.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various aspects described in this disclosure, it is to be understood that other similar aspects can be used or modifications and additions can be made to the described aspect(s) for performing the same or equivalent function of the corresponding aspect(s) without deviating there from. Still further, multiple processing chips or multiple devices can share the performance of one or more functions described in this disclosure, and similarly, storage can be effected across a plurality of devices. Accordingly, the invention is not to be limited to any single aspect, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 17:
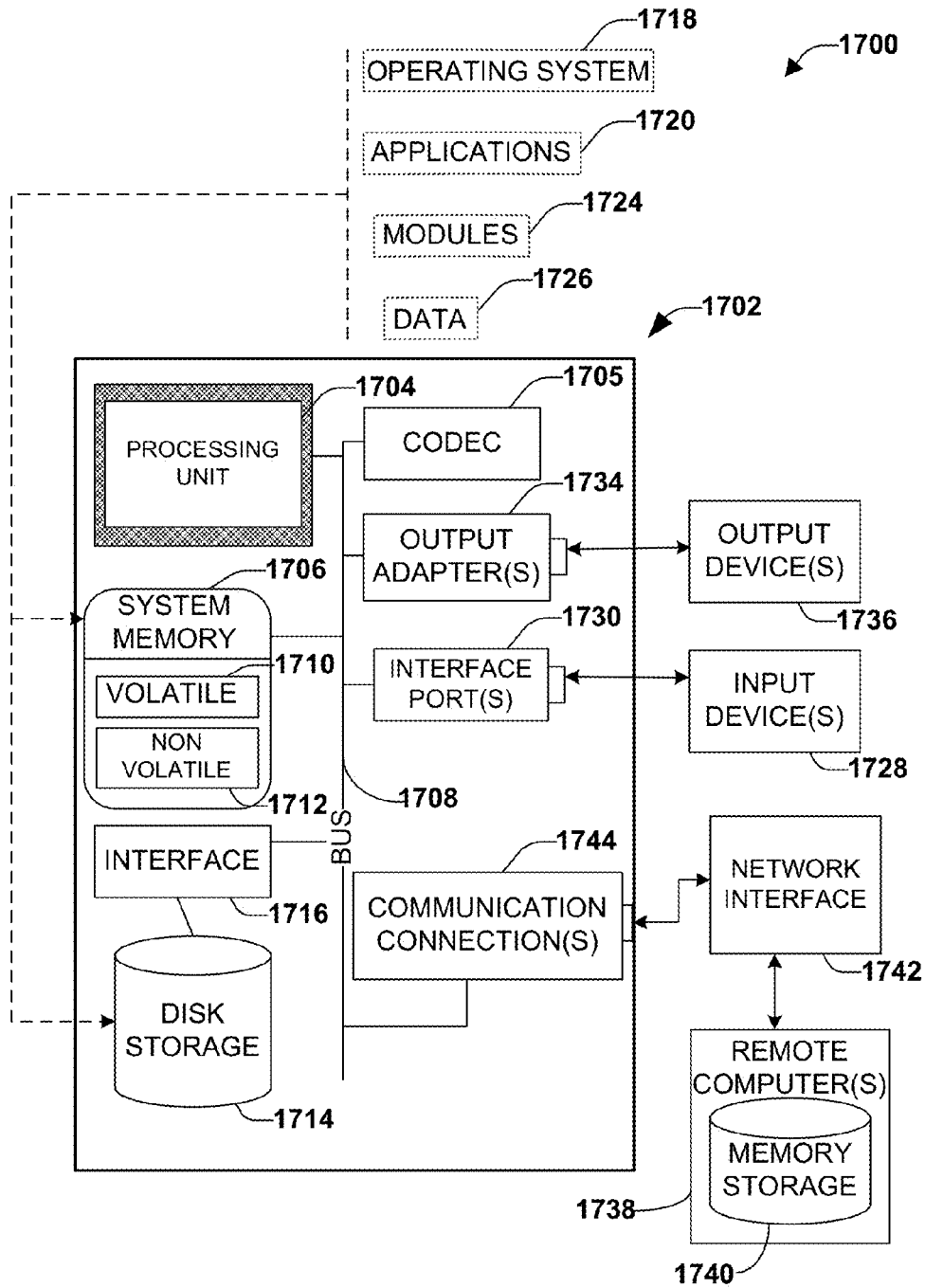
FIG. 17 is a block diagram representing an exemplary non-limiting networked environment in which various aspects can be implemented.

With reference to FIG. 17, a suitable environment 1700 for implementing various aspects of the claimed subject matter includes a computer or computing device 1702. The computer or computing device 1702 includes a processing unit 1704, a system memory 1706, a codec 1705, and a system bus 1708. In an aspect, processing unit 1704 and system memory 1706 can represent processor 104, and memory 106 respectively. The system bus 1708 couples system components including, but not limited to, the system memory 1706 to the processing unit 1704. The processing unit 1704 can be any of various available processors. Dual microprocessors and other multiprocessor architectures also can be employed as the processing unit 1704.

The system bus 1708 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13184), and Small Computer Systems Interface (SCSI).

The system memory 1706 includes volatile memory 1710 and non-volatile memory 1712. The basic input/output system (BIOS), containing the basic routines to transfer information between elements within the computer or computing device 1702, such as during start-up, is stored in non-volatile memory 1712. In addition, according to present innovations, codec 1705 may include at least one of an encoder or decoder, wherein the at least one of an encoder or decoder may consist of hardware, a combination of hardware and software, or software. Although, codec 1705 is depicted as a separate component, codec 1705 may be contained within non-volatile memory 1712. By way of illustration, and not limitation, non-volatile memory 1712 can include read only memory (ROM), programmable ROM (PROM), electrically programmable ROM (EPROM), electrically erasable programmable ROM (EEPROM), or flash memory. Volatile memory 1710 includes random access memory (RAM), which acts as external cache memory. According to present aspects, the volatile memory may store the write operation retry logic (not shown in FIG. 17) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer or computing device 1702 may also include removable/non-removable, volatile/non-volatile computer storage medium. FIG. 17 illustrates, for example, disk storage 1714. Disk storage 1714 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1714 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1714 to the system bus 1708, a removable or non-removable interface is typically used, such as interface 1716.

It is to be appreciated that FIG. 17 describes software that acts as an intermediary between users and the basic computer resources described in the suitable operating environment 1700. Such software includes an operating system 1710. Operating system 1710, which can be stored on disk storage 1714, acts to control and allocate resources of the computer system 1702. Applications 1720 take advantage of the management of resources by operating system 718 through program modules 1724, and program data 1726, such as the boot/shutdown transaction table and the like, stored either in system memory 1706 or on disk storage 1714. It is to be appreciated that the claimed subject matter can be implemented with various operating systems or combinations of operating systems.

A user enters commands or information into the computer or computing device 1702 through input device(s) 1728. Input devices 1728 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1704 through the system bus 1708 via interface port(s) 1730. Interface port(s) 1730 include, for example, a serial port, a parallel port, a game port, and a universal serial bus (USB). Output device(s) 1736 use some of the same type of ports as input device(s) 1728. Thus, for example, a USB port may be used to provide input to computer or computing device 1702, and to output information from computer or computing device 1702 to an output device 1736. Output adapter 1734 is provided to illustrate that there are some output devices 1736 like monitors, speakers, and printers, among other output devices 1736, which require special adapters. The output adapters 1734 include, by way of illustration and not limitation, video and sound cards that provide a means of connection between the output device 1736 and the system bus 1708. It should be noted that other devices and/or systems of devices provide both input and output capabilities such as remote computer(s) 1738.

Computer or computing device 1702 can operate in a networked environment using logical connections to one or more remote computers, such as remote computer(s) 1738. The remote computer(s) 1738 can be a personal computer, a server, a router, a network PC, a workstation, a microprocessor based appliance, a peer device, a smart phone, a tablet, or other network node, and typically includes many of the elements described relative to computer or computing device 1702. For purposes of brevity, only a memory storage device 1740 is illustrated with remote computer(s) 1738. Remote computer(s) 1738 is logically connected to computer or computing device 1702 through a network interface 1742 and then connected via communication connection(s) 1744. Network interface 1742 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1744 refers to the hardware/software employed to connect the network interface 1742 to the bus 1708. While communication connection 1744 is shown for illustrative clarity inside computer or computing device 1702, it can also be external to computer or computing device 1702. The hardware/software necessary for connection to the network interface 1742 includes, for exemplary purposes only, internal and external technologies such as, modems including regular telephone grade modems, cable modems and DSL modems, ISDN adapters, and wired and wireless Ethernet cards, hubs, and routers.

Figure 18:
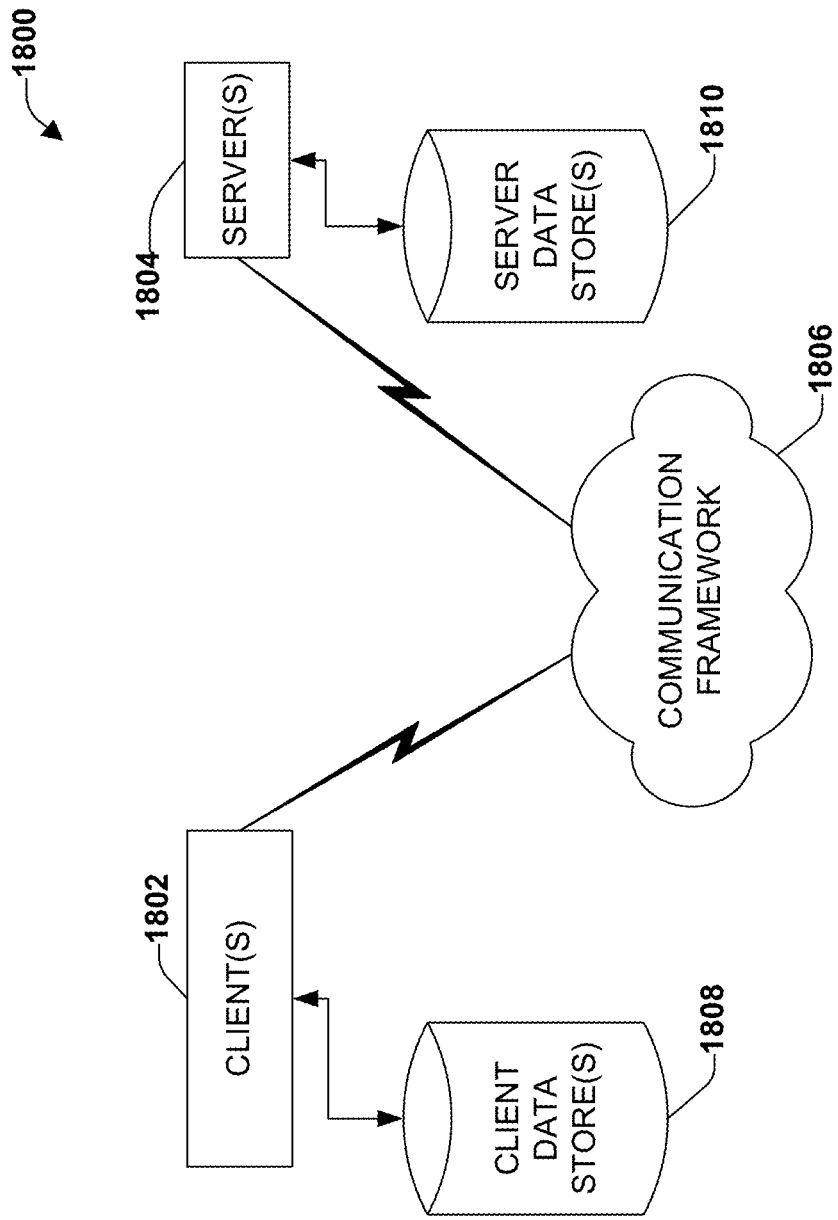
FIG. 18 is a block diagram representing an exemplary non-limiting computing system or operating environment in which various aspects may be implemented.

Referring now to FIG. 18, there is illustrated a schematic block diagram of a computing environment 1800 in accordance with this disclosure. System 1800 can for example be employed in connection with implementing one or more of the systems or components described herein and shown FIGS. 1-9. The system 1800 includes one or more client(s) 1802 (e.g., laptops, smart phones, PDAs, media players, computers, portable electronic devices, tablets, and the like). The client(s) 1802 can be hardware and/or software (e.g., threads, processes, computing devices). The system 1800 also includes one or more server(s) 1804. The server(s) 1804 can also be hardware or hardware in combination with software (e.g., threads, processes, computing devices). The servers 1804 can house threads to perform transformations by employing aspects of this disclosure, for example. One possible communication between a client 1802 and a server 1804 can be in the form of a data packet transmitted between two or more computer processes wherein the data packet may include video data. The data packet can include metadata, e.g., associated contextual information, for example. The system 1800 includes a communication framework 1806 (e.g., a global communication network such as the Internet, or mobile network(s)) that can be employed to facilitate communications between the client(s) 1802 and the server(s) 1804.

Communications can be facilitated via a wired (including optical fiber) and/or wireless technology. The client(s) 1802 include or are operatively connected to one or more client data store(s) 1808 that can be employed to store information local to the client(s) 1802 (e.g., associated contextual information). Similarly, the server(s) 1804 are operatively include or are operatively connected to one or more server data store(s) 1810 that can be employed to store information local to the servers 1804.

In one aspect, a client 1802 can transfer an encoded file, in accordance with the disclosed subject matter, to server 1804. Server 1804 can store the file, decode the file, or transmit the file to another client 1802. It is to be appreciated, that a client 1802 can also transfer uncompressed file to a server 1804 and server 1804 can compress the file in accordance with the disclosed subject matter. Likewise, server 1804 can encode video information and transmit the information via communication framework 1806 to one or more clients 1802.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the aspects of the subject innovation(s). Furthermore, it can be appreciated that many of the various components can be implemented on one or more integrated circuit (IC) chips. For example, in one aspect, a set of components can be implemented in a single IC chip. In other aspects, one or more of respective components are fabricated or implemented on separate IC chips.

What has been described above includes examples of the aspects of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated aspects of the subject disclosure, including what is described in the Abstract, is not intended to be exhaustive or to limit the disclosed aspects to the precise forms disclosed. While specific aspects and examples are described in this disclosure for illustrative purposes, various modifications are possible that are considered within the scope of such aspects and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A method, comprising:
    using at least one microprocessor to execute computer executable instructions stored on at least one non-transitory computer readable medium to perform the following acts:
        detecting a line number in response to a change between a border area pixel in a frame of video content and a video area pixel included in the frame of the video content; and
        in response to identifying a difference in the line number associated with a change between a border area pixel in a subsequent frame of the video content and a video area pixel in the subsequent frame of the video content, updating the line number, wherein the updating further comprises utilizing a threshold that is predetermined to be a size of a macroblock and wherein the threshold accounts for a variation between a border size associated with a top of the frame of the video content and a bottom of the frame of the video content;
        in response to identifying an equality in the line number associated with the change between the border area pixel in the subsequent frame and the video area pixel in the subsequent frame, ceasing the detecting for a further subsequent frame of the video content, wherein the change between the border area pixel and the video area pixel is marked by a change in a luminance value or a change in a chroma value between the border area pixel and the video area pixel;
        deriving a video quality metric as a function of the frame and a frame transcoded from the frame, wherein the deriving comprises: resizing the frame to a size of the frame transcoded from the frame; detecting the line number in which the change between the border and the video area included in the frame and the frame transcoded from the frame occurs; and removing the border from each of the frame and the frame transcoded from the frame; and
        deriving the video quality metric as a function of the frame without the border and the frame transcoded from the frame without the border.

2. The method of claim 1, further comprising: removing the border over an entirety of the video as a function of the line number.

3. The method of claim 1, wherein the border is black in color.

4. The method of claim 1, wherein the updating further comprises identifying an equality between the line number associated with the frame and the line number associated with the subsequent frame over a plurality of frames included in the video, wherein in response to identifying the equality, the updating includes ceasing revision of the variable.

5. The method of claim 1, wherein the border is one of a top border, a bottom border, a right border or a left border associated with the frame.

6. The method of claim 1, wherein the updating further comprises using a limit that accounts for a differential between the borders associated with the right side of the frame and the left side of the frame.

7. The method of claim 6, wherein the limit is predetermined to be a size of a macroblock.

* * * * *